United States Patent [19]

Oswald et al.

[11] 4,142,680

[45] Mar. 6, 1979

[54] HIGH RESOLUTION TIMING RECORDING SYSTEM

[76] Inventors: Robert A. Oswald; Charlie R. Kilet, both of P.O. Box 458, Gardnerville, Nev. 89410

[21] Appl. No.: 779,865

[22] Filed: Mar. 21, 1977

[51] Int. Cl.[2] .......... G06F 15/28

[52] U.S. Cl. .......... 235/92 TA; 235/92 T; 235/92 R; 340/23

[58] Field of Search .......... 235/92 T, 92 GA, 92 TC, 235/92 TA, 92 DP; 364/900 MS File; 324/181, 186; 272/4, 5; 340/23, 323 R; 343/225

[56] References Cited

U.S. PATENT DOCUMENTS

| | | | |
|---|---|---|---|
| 3,508,034 | 4/1970 | Toyama et a. | 235/92 GA |
| 3,546,696 | 12/1970 | Waters et al. | 340/23 |
| 3,588,869 | 6/1971 | Clift | 340/323 |
| 3,781,529 | 12/1973 | Abramson et al. | 235/92 T |
| 3,795,907 | 3/1974 | Edwards | 235/92 TA X |
| 3,946,312 | 3/1976 | Oswald et al. | 235/92 TA X |

*Primary Examiner*—Joseph M. Thesz

*Attorney, Agent, or Firm*—Townsend and Townsend

[57] ABSTRACT

A system for indicating the lapsed time from a start point for each of a plurality of entities, such as race horses, to reach a succession of stations, such as furlong posts, along a path of movement, such as a race track, is disclosed. Preferably, the entities each include radio frequency transmitters carried by each entity, such as a transmitter mounted to the forehead of a horse. Each transmitter emanates a radio frequency signal discrete to that entity. Radio frequency receiving means, such as loops buried in the track, are located at each of the stations and are adapted to receive an interval of signals from each transmitter on each entity when it passes within a reception area of each station. The receiving means communicates to detector means which is adapted to discriminate and detect each discrete radio frequency and screen out the remaining discrete radio frequencies. The detector means generates an output signal which has two functions. First, a tagging signal is generated to identify the entity passing the station. Second, a clock-driven timing counter has its instantaneous count recorded at a latch. An enabling circuit connects tagging information to the frozen clock count and sequentially empties the tagging information into a random access memory. The end product of the apparatus and method of this invention is that each entity, as it proceeds around the path of movement, has its identity and time of passage recorded at each station. By state of the art recall and printout of the information, a system for obtaining splits of racing entities, such as race horses, is obtained.

6 Claims, 10 Drawing Figures

HIGH RESOLUTION TIMING RECORDING SYSTEM

This invention relates to a high resolution timing recording system for recording a pack of closely spaced entities around a succession of stations and recording the time of passage of each entity at each station so that "timing split" information can be generated. The apparatus finds preferred use in a race situation, for example, where horses at a race track pass furlong posts and have their respective times recorded on a substantially instantaneous basis at each furlong post.

SUMMARY OF THE PRIOR ART

It is already known to have discrete racing entities, such as horses, carry discrete transmitters which in turn communicate to discrete detectors. For example, buried loops have heretofore been mounted in a race track. These buried loops sense the passage of transmitters mounted to racing entities passing over them, such as horses. By means of discriminatory circuitry, the passage of each racing entity at each station can be sensed. See U.S. Pat. No. 3,795,907 issued Mar. 5, 1974, entitled "Race Calling System". Heretofore, such timing counters have not been related to discrete times at the passed stations. They have merely been related to the order or "call" of passage. In the case of rapidly passing race horses, such indicators have indicated the sequence of passage of the horses.

Provision has been made to indicate the spatial separation between the passing animals. For example, in the above-referenced U.S. Pat. No. 3,795,907, a timing counter has been roughly equated to the average speed of horse racing animals. By counting the interval between successive recordations, an approximation to the passing spatial interval between entrants can be interpolated.

Knowing the precise time of each racing entity at separated stations along a pathway such as a race course provides extremely useful information. This information can be referred to as "timing splits." For example, timing split information is extremely useful to horse race handicappers. Horse race handicappers need to know with precision the varied racing speeds of animals so that a race may be handicapped to a grouped finish. Knowing that some animals start slow and finish fast and yet other animals start fast and finish slow is vital to a racing handicapper.

Additionally, this same information is equally useful to horse owners, trainers, and jockeys. Being able to urge the animal on in known portions of a race course to take advantage of the animal's characteristic speed variants over a race course can produce optimum results. Recording a timed disclosure which generates the vital time information is extremely useful.

RELATED U.S. PATENT

In our prior U.S. Pat. No. 3,946,312, issued Mar. 23, 1976, a system and method for such timing was disclosed. Antenna loops were situated at predetermined positions about a race track. When a plurality of entities or contestants passed sequentially over loops, preferably mounted at furlong posts, while carrying transmitters arranged to transmit low radio frequency signals of a frequency discrete for each contestant, separate split times were generated. In this related patent, a single timer was connected sequentially to a series of counters. By a disclosed latch arrangement, the counters serially stopped. A counter was stopped for each station passed. Thus, the split times generated appeared on each counter.

SUMMARY OF THE INVENTION

A system for indicating the lapsed time from a start point for each of a plurality of entities, such as race horses, to reach a succession of stations, such as furlong posts, along a path of movement, such as a race track, is disclosed. Preferably, the entities each include radio frequency transmitters carried by each entity, such as a transmitter mounted to the forehead of a horse. Each transmitter emanates a radio frequency signal discrete to that entity. Radio frequency receiving means, such as loops buried in the track, are located at each of the stations and are adapted to receive an interval of signals from each transmitter on each entity when it passes within a reception area of each station. The receiving means communicates to detector means which is adapted to discriminate and detect each discrete radio frequency and screen out the remaining discrete radio frequencies. The detector means generates an output signal which has two functions. First, a tagging signal is generated to identify the entity passing the station. Second, a clock-driven timing counter has its instantaneous count recorded at a latch. An enabling circuit connects tagging information to the frozen clock count and sequentially empties the tagging information into a random access memory. The end product of the apparatus and method of this invention is that each entity, as it proceeds around the path of movement, has its identity and time of passage recorded at each station. By state of the art recall and printout of the information, a system for obtaining splits of racing entities, such as race horses, is obtained.

OTHER OBJECTS AND ADVANTAGES OF THE INVENTION

An object of this invention is to load a random access memory with a group of tagged times for each entity passing each station of a predetermined pathway such as racing horses passing furlong posts along a horse race track. According to this aspect of the invention, a master clock communicates its output signal to a group of serially connected timed decade counters. These counters, connected in parallel to applicable storage latches, are capable of having their count frozen upon signal at the storage latches. Discrete signals from each discrete entity when it passes a recording station are generated. These generated signals give a tagged identifier and at the same time causes parallel connected latches to record and store time information. The recorded and stored time information is then read by a controlled central processing unit which in turn empties the recorded time information into a random access memory. The random access memory records sequentially the tag and the time information for subsequent retrieval.

An advantage of the disclosed system is that proprietary race data can be generated. Moreover, the system cannot be loaded with timing information other than by real outside events. Placing counterfeit information in the system is virtually eliminated.

An advantage of this invention is that groups of serially connected counters with each group correspondent to a racing entity is not required. Rather, a single counter randomly read at discrete microsecond intervals is all that is required.

Yet a further advantage of this invention is that splits can be generated for each racing entity. In the case of race horses on a race track, it is possible to determine split times with greater accuracy than can be obtained by visual clockings. Given the speed and tight packing of modern horse racing, valuable split information can be obtained from the apparatus which cannot be obtained by even spaced human timers along various points of a race track.

Yet a further advantage of this invention is that the end result of the apparatus is a conventionally loaded random access memory. This random access memory can subsequently be tapped on a programmed basis to release the information in any number of desired formats. For example, the random access memory can release, as to each horse only, that horse's time of passage of the successive stations spaced along the track. As another example of the tapping of the random access memory, the memory can determine at any station not only the order or "call" in which the horses pass but additionally their discrete times of passage. Improved handicapping can result. Owners, trainers and jockeys can routinely learn and use characteristic racing patterns of their animals to optimum advantage.

Yet another object of this invention is to disclose a preferred format for loading a random access memory with racing information. According to this aspect of the invention, a continuously running series of time decade counters are communicated in parallel to respective storage latches. Each of these latches in turn communicates to a tagging circuit. By the expedient of sequentially emptying each storage latch through a tagging circuit to a random access memory up to the desired closest timing interval, a random access memory can be loaded with precise timing information. For example, although fifths of a second are commonly used in race track timing, the disclosed system can operate to hundredths of a second.

Yet a further advantage of this invention is that the system is capable of receiving and collating with the tagged time data, listing data for each entity. For example, in the case of a horse race, the owner, trainer, jockey and other information can be conveniently listed and recalled. The result can be a teletype output from the system using conventional teletype outputs which furnishes a complete history of a race.

Other objects, features and advantages of this invention will become more apparent after referring to the following specification and attached drawings in which.

DETAILED DESCRIPTION OF THE DRAWINGS

Figure 6:
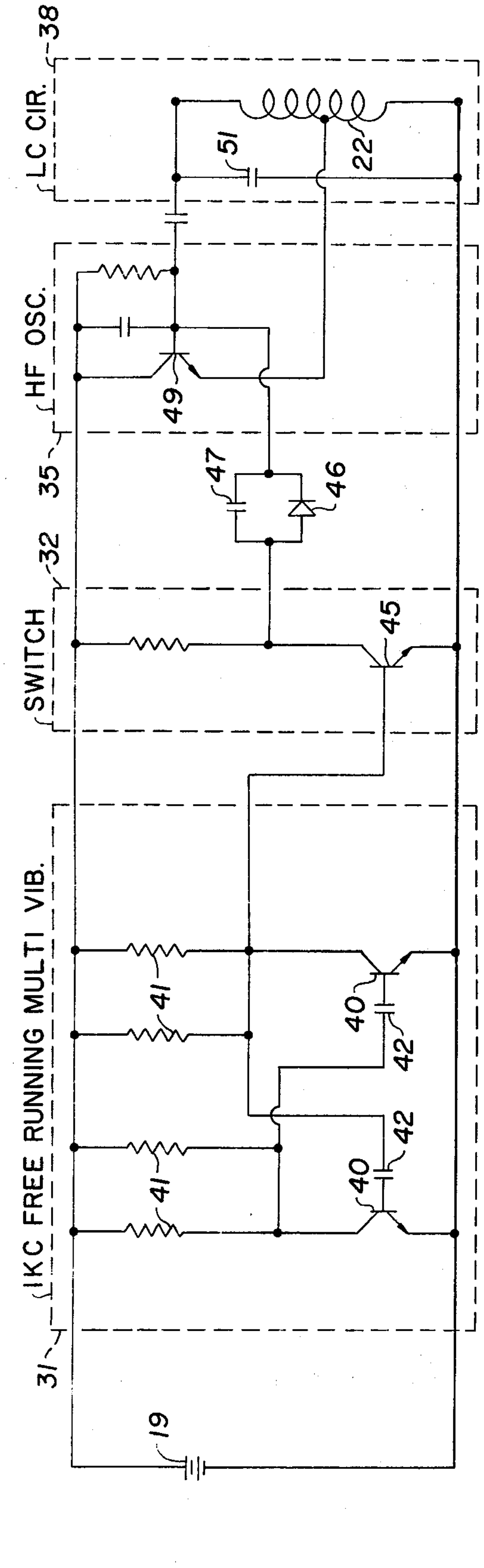
FIG. 6 is an illustration of the circuitry of the transmitter.
Figure 7:
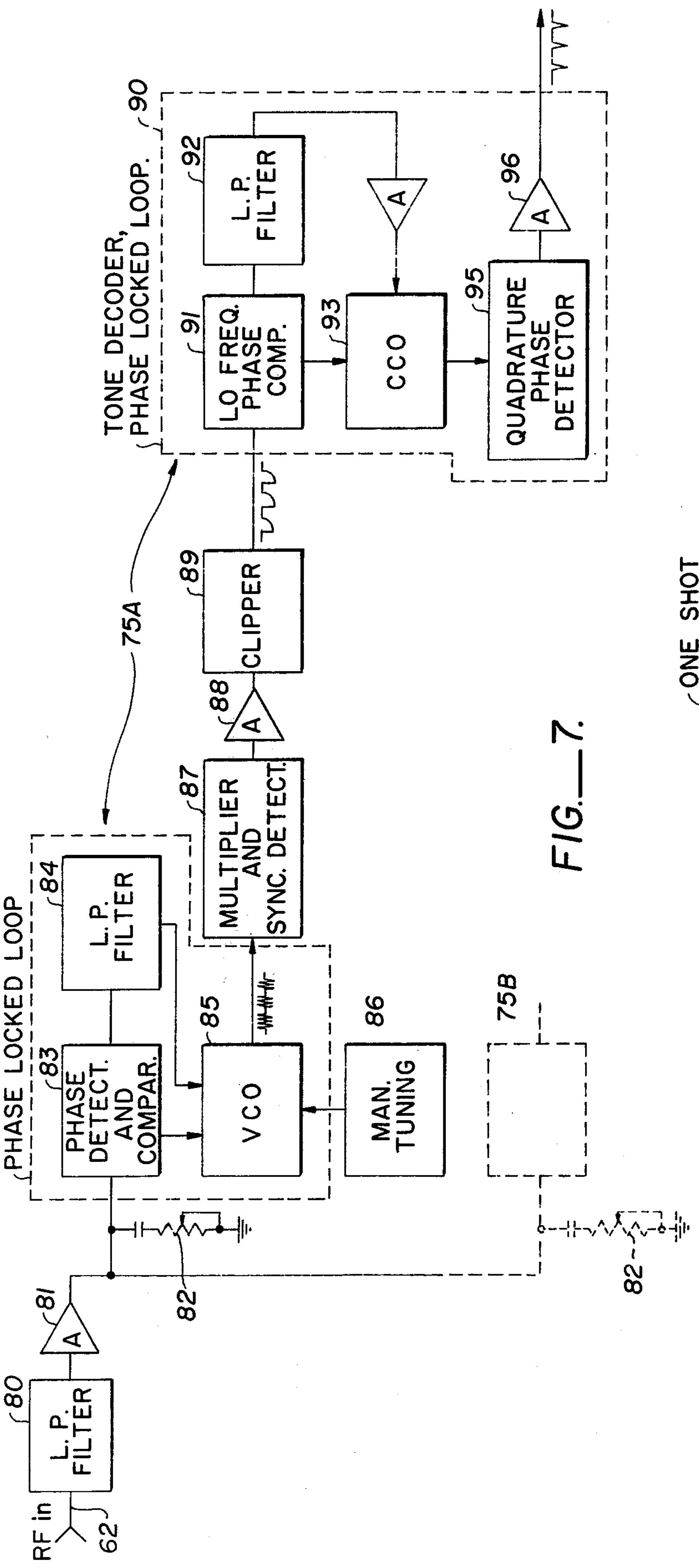
FIG. 7 is a block diagram of a dual phase lock loop piston for receiving the signals from the transmitter and blocking out extraneous signals.

The transmitter for mounting on the contestant encompasses a card 18 upon which a battery 19 and appropriate electrical elements 21 are mounted in conjunction with a printed spiral loop 22 and which provides the inductance and the radiating element for the transmitter. Card 18 is mounted in a pocket 23 on the forehead 25 between the eyes of a contestant such as horse 28. The pocket on its outer face is provided with a number such as 1, 2, 3, etc., which can be a specific identifying number for the particular horse or other contestant. Thus pocket 23 provides the visual contestant identifier as well as a holding pocket for transmitting card 18. The electrical circuit elements 21 as shown in FIGS. 6 and 7 include a 1 KC free running multivibrator 31 which activates an electrical switch or gate 32 to provide a square wave output to a high frequency oscillator 35 in which the LC circuit 38 is incorporated within the oscillator circuit. The multivibrator 31 is of conventional design incorporating a pair of transistors 40 with appropriate resistors 41 and capacitors 42 selected to cause a multivibrator to run free at 1,000 cycles or some other preselected frequency within the audio range. The output from multivibrator 31 is applied to the base of transistor 45 of the switch 32 to provide a square wave output through diode 46 and capacitor 47 to the base of transistor 49 of the high frequency oscillator to cause the oscillator to turn off and on at the frequency rate of the switch 32, i.e. 1,000 cycles.

The oscillator is regulated to oscillate at a frequency determined by the inductance of loop 22 and capacitor 51 which forms the tank circuit for the oscillator. As previously described loop 22 is printed on card 18 and ideally is of a fixed predetermined inductance and configuration for all cards, thus for practical considerations the determinative frequency control element is capacitor 51. Thus the card for each contestant would have a selected value for capacitor 51 so that the frequency output for the high frequency oscillator 35 would be of a discrete different frequency for each card to thereby identify, by frequency, each contestant. It can be seen that the output from the transmitter on card 18 would identify the particular contestant.

It has been found that the system is most satisfactory in the lower RF frequency range, that is in the area below 350 KH, with the spacing between transmitter frequencies being approximately 10 KH, although closer or greater spacing can be used within the framework of the subject invention. For example, it has been found that a good identification and discrimination between contestants can be had with 5 KH spacing or separation. Loops 54 constitute a cable having the outer shield connected to one end to the inner conductor and at the other end the outer shield is connected to ground with the inner conductor being connected to switch 59 for connection of the inner conductor to a common coaxial distribution line.

Figure 1:
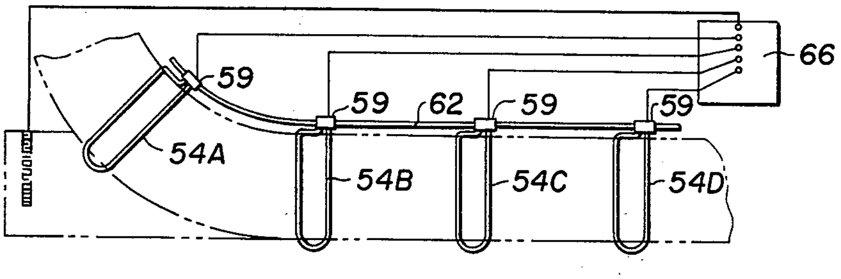
FIG. 1 is a schematic of a portion of a race track illustrating the underground transmitter detecting loops.
Figure 2:
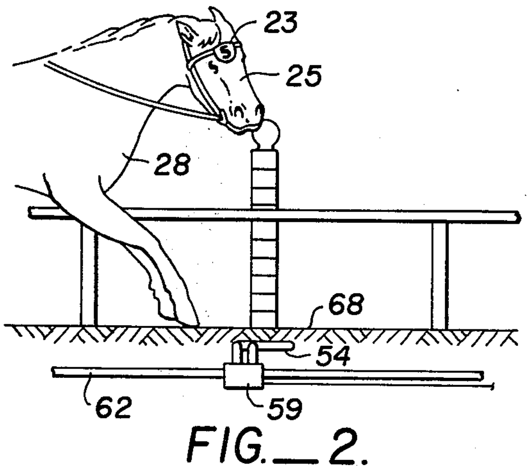
FIG. 2 is an illustration of a horse passing over such a loop.
Figure 3:
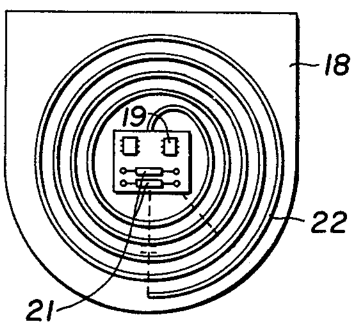
FIG. 3 is a view of a transmitter typically mounted to a horse's forehead.

This loop system acts as a closed circuit untuned transformer presenting a 90° phase relation between voltage and current induced in the system passing over the loop. The switch 59 can be relay activated by appropriate switching (not shown) and thus selected ones of antenna loops illustrated at 54A, 54B, 54C and 54D et seq. of FIG. 1 can be included or excluded from the activating circuit.

Coaxial loops are mounted underground immediately below the surface 68 of the race track so that it can be completely concealed from and provides no impediment to the racing contestants. It is also within the scope of practicality of this device to have the loops mounted above or around the sensing station, however, for aesthetic and practical purposes the mounting under the ground has obvious advantages.

The loop should transverse the entire width of the active section of the track. The exit length 69 and return segment 70 can conveniently be spaced approximately one foot apart. As previously described, the transmitter card 18 is mounted on the forehead of the contestant 25. In this position the radiating face of coil 22 is arranged to be oriented at an angle which is best suited for radiation transferance from inductance 22 to the legs of loop 55. It is best suited to position the card at this angle for most efficient transmission although the device will work with somewhat lesser efficiency if mounted on the ear or side of the head of the horse, for example.

Figure 4:
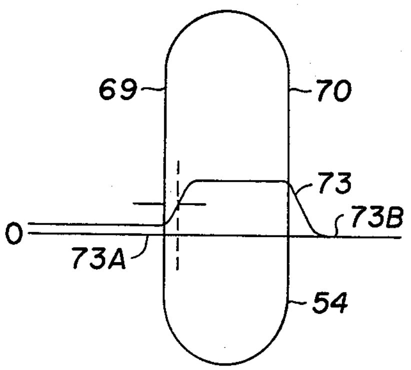
FIG. 4 is an illustration of the wave form detected by the loop during passage of a horse over such a loop.
Figure 5:
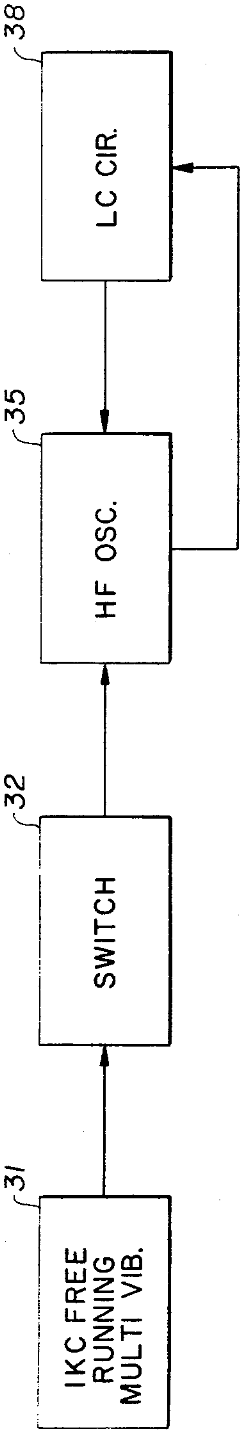
FIG. 5 is a block diagram of a transmitter on the horse's forehead.

As shown in FIG. 4 the underground loop 54 is schematically illustrated by an oval. The signal generated into coaxial cable 62 is illustrated by graph line 73, in which it can be seen that as the transmitter card 18 enters the vertical space immediately above the loop 54 there is a virtual zero or negligible signal input into coaxial cable 62. However, immediately after passing the threshold there is an extremely sharp increase in reception or input into loop 54. This continues in intensity until card 18 has passed over the vertical alignment of the exit leg of loop 54 and thereafter there is a sharp attenuation of the signal action as seen in FIG. 4. Thus it can be seen that the signal generated in the common coaxial line 62 has a square wave which exists immediately upon the card passing over the vertical of the entry leg of the loop and terminates immediately after leaving the vertical area above the exit leg of the loop.

Figure 9:
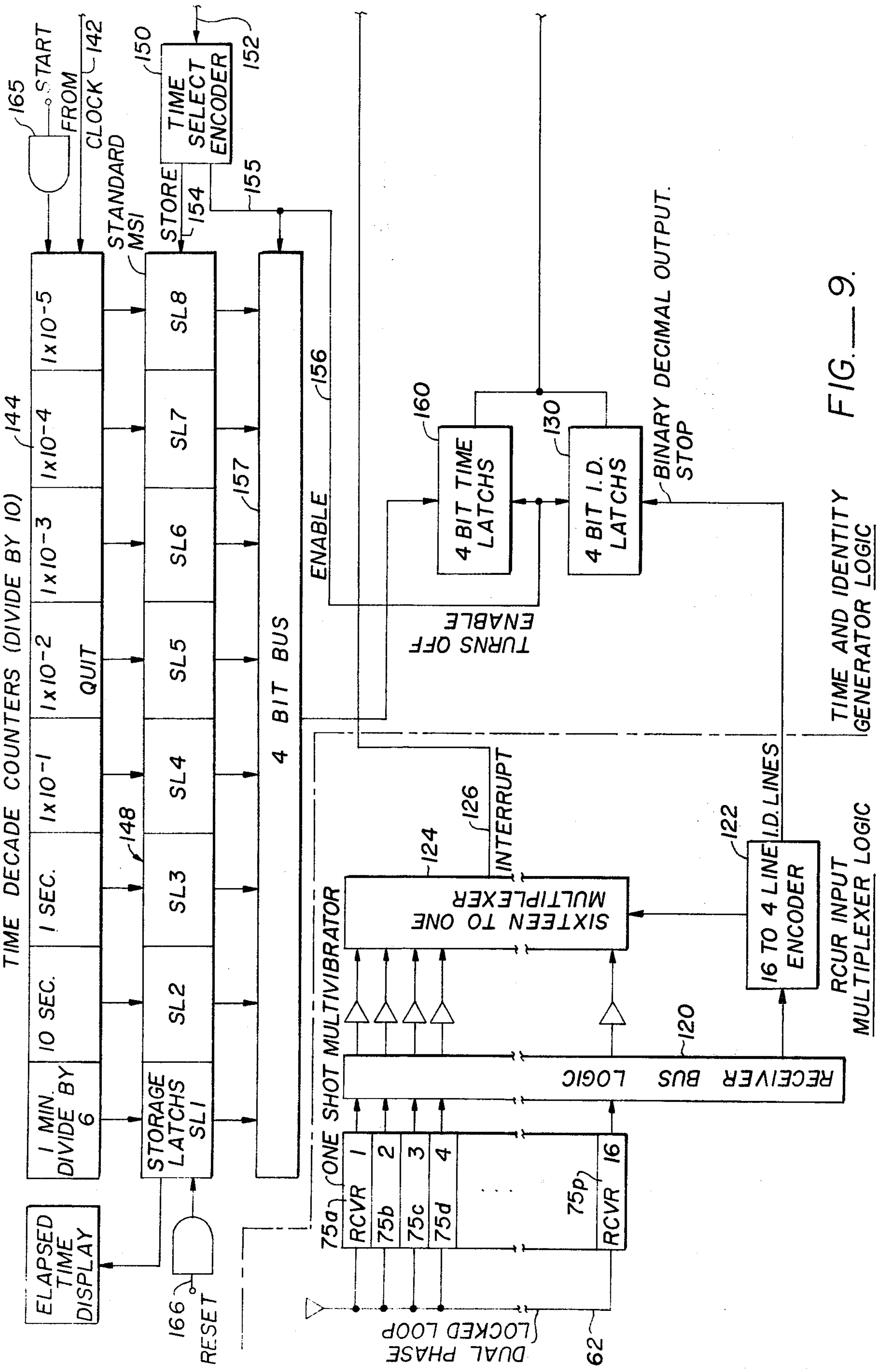
FIG. 9 is a schematic diagram illustrating the circuitry for inputting time information into the system; and, FIG. 10 is a schematic diagram illustrating a typical computer circuit which can be utilized to process the information received.

Referring to FIG. 9, the coaxial cable 62 is connected directly to a plurality of receivers 75. Each of said receivers 75 and identified as 75A, B and C, are arranged and tuned to a frequency compatible with the RF frequency output of a particular transmitting card 18. Thus, for example, receiver 75A could be arranged to receive 360 KH in association with a card having its capacitor 51 arranged to provide a 360 KH output. Wherein receiver 75B might be tuned to receive a frequency of 370 KH for use in conjunction only with a card 18 having its capacitor 51 selected to provide an output of 370 KH. In series with line 62 is a high frequency filter 80 and an amplifier 81. The high frequency filter 80 is of conventional design and arranged to attenuate all RF energy above the frequency range in which the system is designed to operate. Thus, for example, when the system is arranged to operate in or about the 350 KH range, high frequency filter 80 is arranged to attenuate all RF energy above 350 KH. Thus by operating in the low frequency range and attenuating all above the 350 KH limit much spurious man-made and natural radiation can be eliminated. The output from amplifier 81 is thus fed to the respective receivers 75. It is desirable to include a controlled attenuator 82 to reduce the signal level for each receiver so that compensation can be made for the loops having differing sensitivities. By means of the attenuator 82 the signal level to each of the receivers can be identical.

Each of the receivers 75 employs a phase locked loop detection system which is necessary to discriminate the frequencies outside of the specific frequency for which the receiver is programmed for utilization. Such a phase locked loop system is common in the art and as shown in "Signetis Linear" Volume I Data Book on pages 199 through 224, incorporates a phase detector and comparator 83, a filter 84 and a variable frequency oscillator 85 in which the tuning of the oscillator to the specific utilized frequency is by a manual adjustment at 86. In this system only, signals which have a frequency sufficiently identical to the variable frequency oscillator to maintain a phase locked loop can create an output from the system. Thus by this means of discrimination the signal identification of only the selected frequency is obtainable. The signal is then put through a multiplier synchronization detector 87 and when received is then amplified by an amplifier 88 and clipped by a clipper 89 to provide an essentially square wave output, which would be a square wave of the modulating frequency of the free running oscillator 31 on the transmitter card 18. A tone decoder phase locked loop decoder 90 is thus arranged to discriminate against all signals other than those of the predetermined selected audio frequency selected such as the 1,000 cycle modulation previously referred to. Such a phase locked circuit is similar to the phase locked circuit used in the RF section previously described and is described in "Signetis Linear" Volume 1 Data Book under tone detector phase locked loop pages 229 through 238, and includes a low frequency phase comparator 91 and filter 92 and a crystal controlled oscillator 93.

The crystal controlled oscillator 93 is tuned for each of the receivers 75A, B, etc., and can be of the identical frequency; however, it is believed obvious that in some applications where further discrimination between contestants may be desirable, separate audio frequencies for each contestant may be utilized. The output from the crystal controlled oscillator is then detected by a quadrature phase detector 95 which is amplified at 96 to provide a pulse output for use in the timing system as will hereinafter be described. In the receiver system it can be seen that via the filter 80 all signals above the working range of the system are attenuated. The high discrimination of the phase locked RF system rejects all signals other than those within the exact range of the desired frequency and then only those signals which are modulated by the appropriate audio frequency may then be utilized. By this means the authenticity of the signal to the timer is insured.

Figure 8:
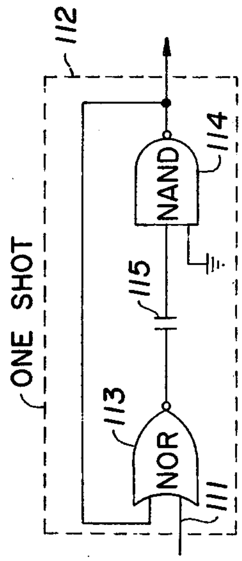
FIG. 8 is a schematic diagram showing a typical one shot multivibrator utilized for receiving discrete signals from each station.
Figure 10:
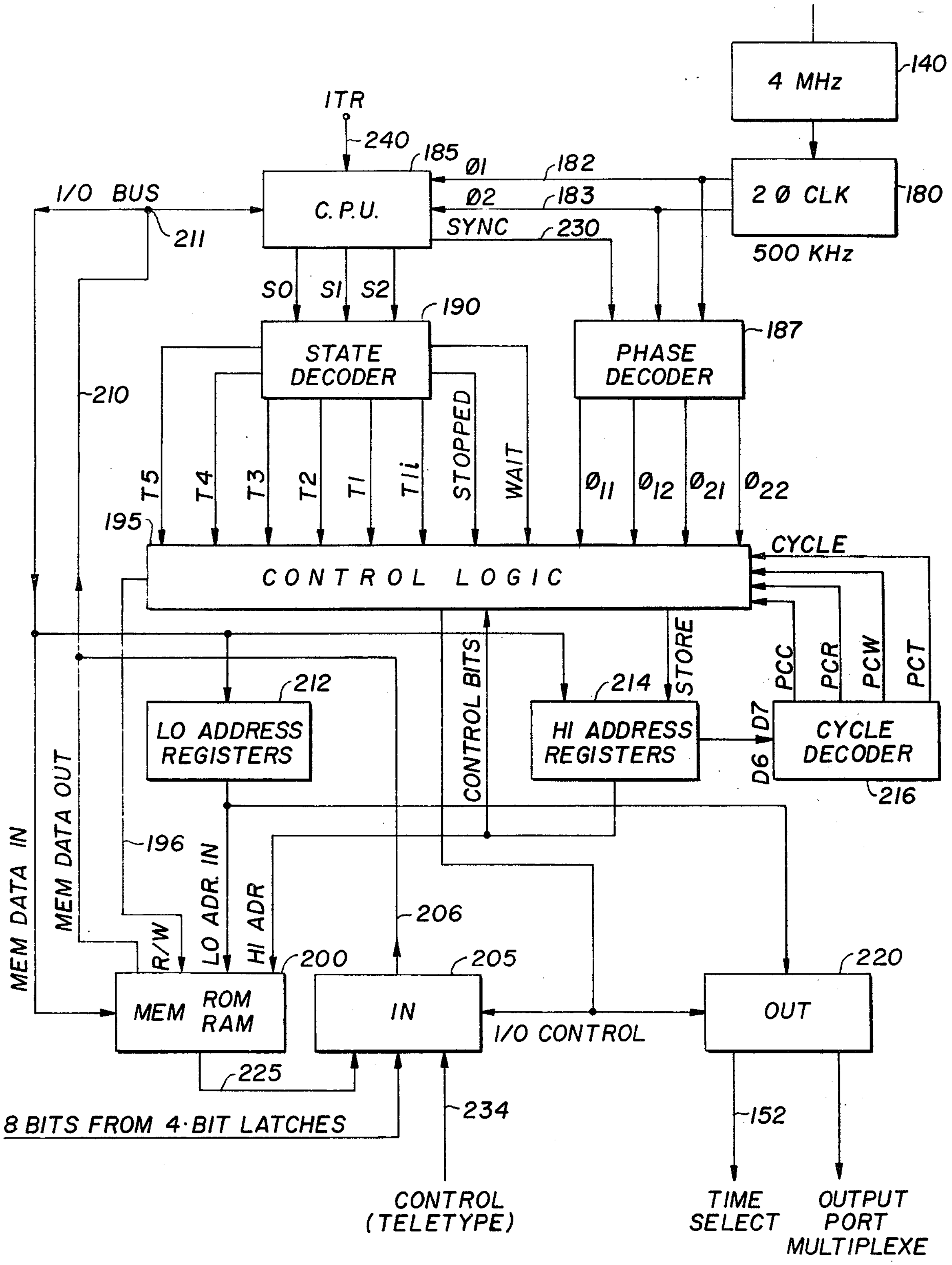

Referring to FIGS. 6, 9 and 10, it can be seen that each of the discrete receivers through their dual phase lock loop circuitry is capable of outputting signals to receiver bus logic 120. It is important that such signals be emanated for a discrete period of time. Therefore, the signal is delivered to a one shot multivibrator 112 schematically shown in FIG. 8. Typically, the signal is received at norgate 113 at input 111. Conventional one shot multivibrator circuit couples to a nand gate 114 through a capacitor 115. This capacitor determines the pulse length for the one shot multivibrator 112 and delivers a discrete signal for each discrete receiver to receiver bus logic 120.

Receiver bus logic communicates the signal from each receiver to two discrete sources. The first of these sources is a 16 to 4 line encoder 122. Line encoder 122 is a conventionally connected encoder matrix having output through four discrete nand gates, which encoder emanates a discrete four bit identification for each of the receivers 75A–75P.

The 16 to 4 line encoder is connected at its output to enable a 16 to 1 multiplexer 124. That is to say, once the line encoder has received the identity of a triggered receiver (and thus a transmitter passing a loop), the 16 to 1 multiplexer is in itself enabled. This multiplexer generates an interrupt signal 126, which interrupt signal then passes to computer circuitry illustrated with respect to FIG. 10.

Generally speaking, the interrupt circuitry of the computer causes a scan of time to be made on an instantaneous basis. The explanation of this scan will be discussed hereinafter.

The 16 to 4 line encoder passes its four bit identification output to a four bit identification latch 130. The function of the four bit identification latch 130 is to store the identification of a tripped receiver. This stored identification is thereafter sequentially fed with time information to the random access memory. It is important to note that this identification information is used more than once. For example, as will hereinafter be explained, it is first used to tag minute information as it is sent to storage. Thereafter it tags the tens of second information, the second information, the tenths of second information, and the hundredths of second information. This sequential tagged information is fed to the random access memory for state of the art recall when readout of the race results are desired.

Referring briefly to FIG. 10, an oscillating crystal 140 has an output 142 which feeds directly to a time decade counter 144. Referring generally to FIG. 9, time decade counter 144 includes a group of serially connected divide by circuits which circuits commence with one hundred thousandths of a second and divide into respective tens of thousandths, thousandths, hundredths, tenths, seconds, tens of seconds, and minutes, by appropriate counters. All the counters are identical except a divide by 6 counter connected at the tens of second positions so that the pulses from the clock may readily translate into minutes.

The output of the respective time decade counters is four bit informational logic which is in turn communicated to respective storage latches 148. The respective storage latches are each discretely identified by the numbers SL1 for minutes, SL2 for tenths of seconds, down through SL8 for hundred thousandths of seconds.

A time select encoder 150 triggers the respective latches 148. The receipt of a signal at time select encoder 150 through input 152 will be hereinafter set forth. Once a signal is received at time select encoder 150, it passes an output through output 154 to freeze the respective latches. At the same time, an output 155 sequentially enables stored time information to be read. Output 155 communicates to a four bit bus 157. Four bit bus 157 first causes storage latch 1 to empty its four bit minute information into time latch 160. The remaining latches are thereafter serially emptied as will hereinafter be described.

The sequence of the emptying of the respective four bit latches can be summarized. Specifically, each piece of time information comprises eight bits. Four of these bits come from the identification latch. The remaining four of the bits are time information. These come from the appropriate time latch.

In sequence, the four bit identification information and the four bit time information empties a minute entry tagged with the identification information. Thereafter, the four bit bus indexes to empty the tens of seconds latch together with the four bit identification information. The process is repeated. Sequentially, four bit second information, four bit tenths of second information, and four bit hundredths of second information are all emptied. Each time the four bit numeric time value is tagged with the entity identification value. This information is sequentially emptied into a random access memory wherein the information can later be recalled by state of the art readout techniques.

At the hundredths of second interval, output ceases. Thus, the remaining thousandths, tens of thousandths, and hundreds of thousandths registers are not utilized. Rather, these registers can be used to discriminate between closely spaced entities passing the same mark at substantially the same interval. It should be understood that since the readouts here utilized are read in less than one hundred thousandths of a second, simultaneous recordation of two entities passing a given loop is, as a practical matter, eliminated. Conventional circuitry permits clock starting as at clock start input 165. A reset for the latches is provided at 166 to clear the storage latches of the last recorded time.

It is an important feature of this invention that the time information generated can only occur through real world events. That is to say, in the case of a horse race the time information can only be generated by transmitters passing loops placed in sequential intervals about a race course. Thus, the time information obtained by the circuitry of this invention is secure. It is not possible to place into the system counterfeit information. Thus, the contents of a random access memory loaded with time input bits will be secure. This is especially important in races where wagering, especially as it relates to handicaps, occurs.

Having thus described the recordation of time, the computer circuitry can now be described. First, the overall portions of the computer will be described together with their inputs. Second, brief reference will be made to the states through which computer passes. Finally, an example of the recording of a specific time interval will be given.

Referring to FIG. 10, the computer for use with this invention is schematically illustrated. Specifically, a 4 MH clock 140 feeds its output to a divide by two phase clock 180. The divide by two phase clock has a total output in the range of 500 KH. The clock has two discrete outputs 180, 183. Each of these outputs communicates to a central processing unit 185 and a phase decoder 187. The central processing unit here described is a standard item of manufacture. For example, it can be obtained from Intel Corporation of Santa Clara, Calif. under the designation 8008.

Regarding the signal put out by the phase divider clock, it consists for each state of the central processing unit 185 of four discrete signals. These signals are output by the phase decoder and are identified sequentially as $\phi_{11}$, $\phi_{12}$, $\phi_{21}$, and $\phi_{22}$. All of these phases are passed through with respect to any given central processing unit state.

Central processing unit 185 puts out three bits of logic to a state decoder 190. State decoder 190 then passes through discrete possible states with respect to the control logic. These states sequentially are states $T_1$, $T_2$, $T_3$, $T_4$, $T_5$, an interrupt state ($T_{1i}$), a stopped state (STP), and a wait state (HLT). As can be seen, a total of eight states are possible and are communicated through the control logic 195.

A read-write connection 196 is made to a memory 200. Memory 200 may be described as including three sections. The first is a read only memory (ROM) which contains the programmed instructions for the central processing unit. This section of the memory is that section addressed for the computer to follow discrete steps in its programs. As will hereinafter be explained, a section of the memory is addressed upon command for the computer to align itself for the reception of data.

Thereafter, data is received into the second section of the memory which is the random access memory (RAM). Typically, the data received will be the time passage of an entity at a particular detector station.

In addition, it is convenient to provide a third portion of the random access memory with listing data. For example, the name, the owner, the trainer, and the jockey of the horse, and other pertinent listing data can be provided in such a memory for use with the invention herein.

As will be apparent to those skilled in the art, a readout of the memory can be made for this data. Typically, memory data passes from memory 200 into an input port 205. At input port 205 memory data, such as discrete instructions, can be passed via output 206 into and for processing by the central process unit 185 via data buss 210. It is desired in the present program to include a low address register 212 and a high address register 214. During the respective states of the computer it should be understood that these address registers handle broadly two discrete functions.

First, the address registers can serve either to address memory or become part of an input-output instruction. In the latter case, the first two bytes of information (one byte to the low address register and one byte to the high address register) literally amount to connection instructions for the various components of the computer.

When either the memory is addressed or computer connected to be in a receptive state for either an input or an output, the low address register 212 and the high address register 214 can then accept a second byte of information. These bytes of information either input a byte of data into the memory, fetch an instruction byte from the memory, or outputs a byte of data.

Regarding the second bytes of data, the low address register comprises the byte of data which the machine desires to input, fetch, or output. The high address register is instructional, that is it carries within its register in eight bits the instructions for handling the particular informational byte.

The last two bits of the high address register are fed to a cycle decoder 216. Cycle decoder 216 determines the appropriate cycle to be utilized. These cycles in turn are fed back to the control logic to feed an instruction byte cycle (PCI), an input-output cycle (PCC), a memory write cycle (PCW) and a memory read cycle (PCR). This cycle decoder dictates through the control logic the specific state sequence through which the processing unit is to pass.

An output port 220 is provided. This output typically communicates to an output port multiplexer. As an example of outputs that can be addressed through this port, teletypes, numeric displays, and the like all can be used. As an important port for purposes of the instructions followed herein, a time select port 152 is included in output port 220. It is this output 152 which causes the storage latches to freeze upon appropriate detection of an entity crossing a detection loop 54 with its respective transmitter 23.

It can be seen that input port 205 includes an input from the memory 225. It also includes an eight bit bus from the two 4 bit latches 130, 160. As will be remembered, these respective latches are the identification latch 130 and the time latch 160.

Having thus described the overall schematic embodiment of the central processing unit as arranged in this invention, the timing can be briefly set forth. Timing is controlled through a synchronous connection 230. Each cycle of synch contains two $\phi_1$ pulses and two $\phi_2$ pulses and is called a state. Thus, each state contains the four sequential pulses hereinbefore described. Each of the states comprises three parallel bits on status lines S0, S1 and S2.

A brief review of an instruction fetch cycle (PCI), an input-output cycle (PCC), and a memory write cycle (PCW) with respect to the computer timing may be helpful.

In an instruction fetch cycle, typically the processor receives an input from an outside control such as a teletype through bus 234. This data is passed through bus 206 to bus 210 to a bidirectional bus 211. At bus 211 the serial information from a teletype is, for example, placed in parallel and thereafter output in sequence, first to the low address register, and thence to the high address register, with each of these registers receiving the respective eight bits of information.

These outputs typically comprise a memory address in the read only memory. This address will, in such a sequence, typically be an input-output cycle. That is to say, the respective logical states within the computer will be aligned for either the input of specific information or the output of specific information.

When the machine is in its desired state, either a memory write cycle (PCW) or a memory read cycle (PCR) will be executed. Typically, during state T1 the low address register 212 will be addressed with memory line information. During state T2 the high address register 214 will be addressed with memory page information. With the memory thus enabled at the appropriate line and page, in state T3 a memory read or write will occur within the random access portion of memory 200. Typically, eight bits contained in the low address register will comprise the information; the eight bits in the high address register will include the execution instructions together with the type of cycle specifically desired.

The key to the acquisition of timing data is the interrupt input 240. The interrupt input causes the state decoder 190, through related logic, to cause the central processing unit to pass to a state T1i (interrupt state). This interrupt state allows the control logic to complete a specific micro-instruction, to remember where, in a specific routine, central processing unit is and causes the recordation of timing information. This recordation of timing information is first actuated by an instruction fetch cycle (PCI), thence an input-output cycle (PCC), this latter cycle taking the machine to an input state, and finally a memory write cycle (PCW). Tracking of such an instruction through the entire system and with specific reference to FIGS. 9 and 10 can be instructive.

Remembering from the description of FIG. 9, when 16 to 1 multiplexer was enabled from an output from the 16 to 4 line encoder 122, interrupt signal 126 was generated. Interrupt signal 126 passes through the interrupt signal input 240 into the central processing unit 185. At this juncture, CPU will finish any one of the remaining six cycles and then go to state $T1_i$ instead of state T1. During this time, appropriate exit circuitry can jam a reset vector onto the data lines. During the state T3, the program counter stack is pushed down one level. Thus the machine, when it is in the process of executing other instructions, may return to such instruction at the appropriate instructional interval after the interrupt call is in effect serviced.

The interrupt signal triggers an instruction fetch cycle (PCI). Assuming that horse 4 has crossed a particular gate, receiver 75D will have output an appropriate signal through its respective one shot multivibrator. Upon the receipt of an interrupt signal, an instruction fetch cycle to emanate an output to time select encoder 150 will commence. Specifically, at state T1 and T2, appropriate portions of the memory will be addressed in specific line and page designations. An instruction will be fetched from an appropriate portion of the memory.

This instruction will be to place the machine in a desired output state. Typically, the output state desired will be for an output at 152 of the output port 220. This is the signal which freezes the respective storage latches at the time interval desired. Memory data for the output state will pass out of the memory along bus 210 into the central processing unit and thence to the respective low register and high register in discrete eight bit serial bytes. A time select signal will emanate from output port 220.

The next instruction fetch cycle will place the computer in an input state. This input state will be for the reception and recordation of data.

As previously described, time select signal 152 will freeze the storage latches. At the same time an output via 155, 156 will enable the two respective four bit latches 130 (the identification latch) and 160 (the time bit latch) to transmit their respective values to an eight bit bus into the input port. Indexing will occur as previously described with the minute latch being read first, then on through the hundredths of seconds latch. Typically, the machine will then cycle so that it is capable of receiving an input at input port 205 from the two four bit latches. Typically, connection to the central processing unit will be enabled through bus 206 and 210 through bidirectional bus 211.

A memory write cycle (PCW) will then be executed. During state T1 the low address register will receive a line address. During state T2 the high address register will receive a page address. During state T3 memory data will be addressed to the random access portion of the memory.

Reading will cascade down through the respective latches. Each time, bits of information will be recorded. Identification information and a time latch information will be serially recorded in the random access memory. This reading process will continue until the hundredths of second register latch is read. At this time, the central processing unit will do one of two things. It will either proceed to the stop state or will continue on with the interrupted sequence.

It should be understood that it is preferred that during the recordation of race data, the central processing unit not be placed to an output state. This is because the information recorded by the instrument is proprietary. It is not meant to be released until after the race is completed. Preferred programing will make the release of information during a race in progress not possible.

Once a random access memory is loaded with time information from a single entity, readout can be made in a state of the art way. For example, a fetch instruction can be entered into the input port 205 through the control unit such as a teletype via bus 234. This serial information would pass to the central processing unit and would be changed in a parallel bit for a read only memory instruction fetch. This instruction fetch would first align the respective bus within the control logic through the low and high address registers 212, 214 for the output data. Thereafter, the memory would be specifically addressed and data output in a serial fashion.

It is believed state of the art that the output data can occur, in several formats. For example, the order of passage together with the time of passage of a group of entities such as a field of racing horses could occur. Alternately, the memory could be addressed and tested so that it would readout just the times of a specific entity around a race track. For example, and assuming that detectors were placed at furlong posts, the time of horse four at each furlong post could be printed out on a single piece of paper. Likewise, once the time information is serially stored in the random access entry, each of the stations for each of the entities various read cycles can be practiced, those all being known to those having skill in the computer arts.

It should be emphasized that an apparatus and process for recording of race data has here been disclosed. Regarding the process, the steps include the freezing of time information and the serial recordation of time information into a random access memory. It is to be emphasized that this serial recordation occurs in response only to real world events. Entry of time information other than by the disclosed circuitry with the disclosed device is not possible. Secure race results follow.

I claim:

1. A system for indicating a lapsed time from a start point for each of a plurality of entities to reach a succession of stations along a path of movement of all of said entities comprising: radio frequency transmitting means carried by each of said entities, each said means emanating a radio frequency signal discrete for each entity; radio frequency receiving means located at each of said stations and each adapted to receive an interval of signals from said transmitting means when the transmitting means carried by said entity is within a reception area of each said station; a plurality of detector means connected to said receiving means, each said detector means being adapted to discriminate and detect signals of a selected one of said discrete radio frequency signals; activating means associated with each of said detector means constructed and arranged to generate an output signal when an interval of signals from the corresponding discrete radio frequency signal is received thereby; tagging means for generating a binary tag word identifying the output signal corresponding to each said entity connected to each said activating means; a timing counter connected to each of said detector means; clock means operable to operate said timing counter; start means connecting said clock means to said timing counter to start said timing counter; a timing counter latch means for said timing counter operable by said output signal to cause said timing counter latch means to store a binary count representative of said lapsed time upon being actively energized thereby; random access memory means coupled to said tagging means and said timing counter latch to sequentially store each said count and each said tag and;

control means responsive to said output signal for effecting transfer of each said tag and each said count to said random access memory and for causing storage thereof in said random access memory as a multi-bit data word whereby at least each said multi-bit data word will indicate lapsed time from said start for each said entity upon an interval of signals of the discrete radio frequency signal being received at each of the succession of predetermined stations.

2. The invention of claim 1 and wherein said timing counter and said timing counter latch means includes a discrete counter for each digit of time information recorded and a discrete latch for each digit of time recorded.

3. The invention of claim 1, wherein the control means includes selecting means for obtaining selected portions of said count and for combining each said selected portion with said tag as said multi-bit data word.

4. The invention of claim 1, wherein the control means includes output means for effecting retrieval of said multi-bit data word from said random access memory and for transferring said data word to a display apparatus upon receipt of a request signal from said display apparatus.

5. A process for indicating the lapsed time from a start point for each of the plurality of entities to reach a succession of stations along a path of movement of said entities comprising: providing radio frequency transmitting means carried by each of said entities, each said means emanating a radio frequency signal discrete for each said entity; providing radio frequency receiving means located at each of said stations and each adapted to receive an interval of signals from said transmitting means when the transmitting means carried by said entity is within a reception area of said station; providing a plurality of detector means connected to said receiving means, each said detector means being adapted to discriminate and detect signals of a selected one of said discrete radio frequency signals; detecting said signals to generate an output signal when an interval of signals from a corresponding discrete radio frequency signal is received at said radio frequency receiving means; tagging each said signal to identify the output signal corresponding to each said entity; providing a timing counter connected to each of said detector means; providing a timing counter latch means for said timing counter operable by said output signal to cause said timing counter latch means to store a count upon being actively energized thereby; simultaneously releasing from said timing counter latch means and said tagging means a signal in the form of a binary word having a clock count and an entity tag with said count; sequentially storing each binary word in a storage means, whereby at least each said binary word indicates lapsed time from said start for each said entity upon an interval of signals of the discrete radio frequency signal being received at each of the succession of predetermined stations; and retrieving said binary word from said storage means in response to a request signal.

6. The process of claim 5 including the steps of providing a timing counter latch means for recording each digit of time information, sequentially tagging each digit of time information, and sequentially storing each digit of time information and each tag for a series of sequential digits with the same tag to record the time of each entity at each said station.

* * * * *